United States Patent [19]
Fritz et al.

[11] Patent Number: 5,618,438
[45] Date of Patent: Apr. 8, 1997

[54] METHOD OF ISOLATING AN ANALYTE USING A SOLID PHASE EXTRACTION MEDIUM

[75] Inventors: James S. Fritz; Philip J. Dumont, both of Ames, Iowa; Donald F. Hagen, Woodbury, Minn.; Craig G. Markell, White Bear Township, Ramsey County, Minn.; Luther W. Schmidt, Batesville, Minn.

[73] Assignee: Minnesota Mining and Manufacturing Company, St. Paul, Minn.

[21] Appl. No.: 447,662

[22] Filed: May 23, 1995

Related U.S. Application Data

[62] Division of Ser. No. 238,364, May 5, 1994.

[51] Int. Cl.$^6$ .................................................. B01D 15/04
[52] U.S. Cl. ........................ 210/679; 428/323; 428/327
[58] Field of Search .......................... 210/679; 428/281, 428/283, 323, 327

[56] References Cited

U.S. PATENT DOCUMENTS

| | | | |
|---|---|---|---|
| 3,489,699 | 1/1970 | Battaerd et al. | 260/2.1 |
| 4,153,661 | 5/1979 | Ree et al. | 264/120 |
| 4,208,194 | 6/1980 | Nelson | 55/385.4 X |
| 4,265,768 | 5/1981 | Beasley et al. | 210/682 |
| 4,331,541 | 5/1982 | Akiyama et al. | 210/679 |
| 4,373,519 | 2/1983 | Errede et al. | 128/156 |
| 4,382,124 | 5/1983 | Meitzner et al. | |
| 4,450,287 | 5/1984 | Paxson | 560/241 |
| 4,460,642 | 7/1984 | Errede et al. | 428/283 |
| 4,512,897 | 4/1985 | Crowder, III et al. | 210/656 |
| 4,537,683 | 8/1985 | Isacoff et al. | 210/667 |
| 4,565,663 | 1/1986 | Errede et al. | 264/120 |
| 4,722,898 | 2/1988 | Errede et al. | 435/182 |
| 4,810,381 | 3/1989 | Hagen et al. | 210/502.1 |
| 4,855,144 | 8/1989 | Leong et al. | 424/487 |
| 4,871,671 | 10/1989 | Errede et al. | 435/182 |
| 4,895,662 | 1/1990 | Stevens | 210/692 |
| 4,906,378 | 3/1990 | Hagen et al. | 210/635 |
| 4,935,142 | 6/1990 | Sternberg | 210/634 |
| 4,971,697 | 11/1990 | Douden et al. | 210/502.1 |
| 4,971,736 | 11/1990 | Hagen et al. | 264/22 |
| 5,009,869 | 4/1991 | Weinberg | 204/72 X |
| 5,019,232 | 5/1991 | Wilson et al. | 204/180.1 X |
| 5,071,565 | 12/1991 | Fritz et al. | 210/692 |
| 5,071,610 | 12/1991 | Hagen et al. | 264/120 |
| 5,104,545 | 4/1992 | Means et al. | 210/650 |
| 5,114,591 | 5/1992 | Patzelt et al. | 210/663 |
| 5,135,656 | 8/1992 | Means et al. | 210/650 |
| 5,230,806 | 7/1993 | Fritz et al. | 210/692 |
| 5,236,594 | 8/1993 | O'Reilly et al. | 210/656 |
| 5,279,742 | 1/1994 | Markell et al. | 210/638 |
| 5,292,818 | 3/1994 | Oishi et al. | 525/301 |

FOREIGN PATENT DOCUMENTS

| | | |
|---|---|---|
| 0346037 | 6/1989 | European Pat. Off. . |
| 0556879 | 8/1989 | European Pat. Off. . |
| 2-126155 | 5/1990 | Japan . |
| 2024886 | 1/1980 | United Kingdom . |

OTHER PUBLICATIONS

Analytica Chimica Acta, 236, 157–164 (1990).
LC/GC, 9:5, 332–337 (1991).
J. Chrom. 629 (1993) 11–21.
J. S. Fritz et al., J. Chrom. 641 (1993) 57–61.
Contemporary Practice of Chromatography, C.F. Poole & S.A. Schuette, Elsevier, NY, NY (1984) pp. 2–6.

(List continued on next page.)

Primary Examiner—Kathleen Choi
Attorney, Agent, or Firm—Gary L. Griswold; Walter N. Kirn; Lorraine R. Sherman

[57] ABSTRACT

A functionalized macroporous poly(styrene divinylbenzene) particle comprises at least one ionic functional group covalently bonded thereto, the functionalized particle having sorptive capability towards an analyte, said functional group being present in the range of 0.1 to 2.5 milliequivalents per gram of poly(styrene divinylbenzene). The functionalized particles can be used in a packed column or enmeshed in a nonwoven web for utility in solid phase extraction applications.

30 Claims, 1 Drawing Sheet

OTHER PUBLICATIONS

J.J. Sun and J.S. Fritz, J. Chrom. 522 (1990) 95–105.

Design News, Feb. 9, 1987, Cahners Publishing Company.

L. A. Errede, *Journal of Applied Polymer Science,* 31, 1986, pp. 1749–1761.

L.A. Errede, et al., *Chemically Modified Surfaces in Science and Industry,* 2, Proceedings of the Chemically Modified Surfaces Symposium, Fort Collins, Colo. (1987) pp. 91–104, Gordon and Breach Science Publishers, N.Y.

American Biotechnology Laboratory, Oct. 1988, pp. 26–32.

Chromatography Electrophoresis Immunochemistry Molecular Biology, HPLC (BioRad), Price List O, Mar. 1989.

Chromatography Electrophoresis Immunochemistry Molecular Biology, HPLC (BioRad), Price List P, Mar. 1990.

Life Science Research Products (BioRad), Price List Q, Mar., 1991.

Life Science Research Products (BioRad), Price List R, Jan., 1992.

Life Science Research Products (BioRad), Price List S, 1993.

Patent Abstracts of Japan, vol. 14, No. 349 (P–1084) & JP,A,02 126155 (Mizunko Masako) 15 May 1990.

Reactive Polymers, vol. 1, 1983, Amsterdam pp. 215–226, R.E. Barron, "Reproducible Preparation of Low–Capacity Anion–Exchange Resins".

Chemical Technicians' ready Reference Handbook, ed. by Shugan et al., McGraw–Hill Inc., New York 1990 (pp. 784–787).

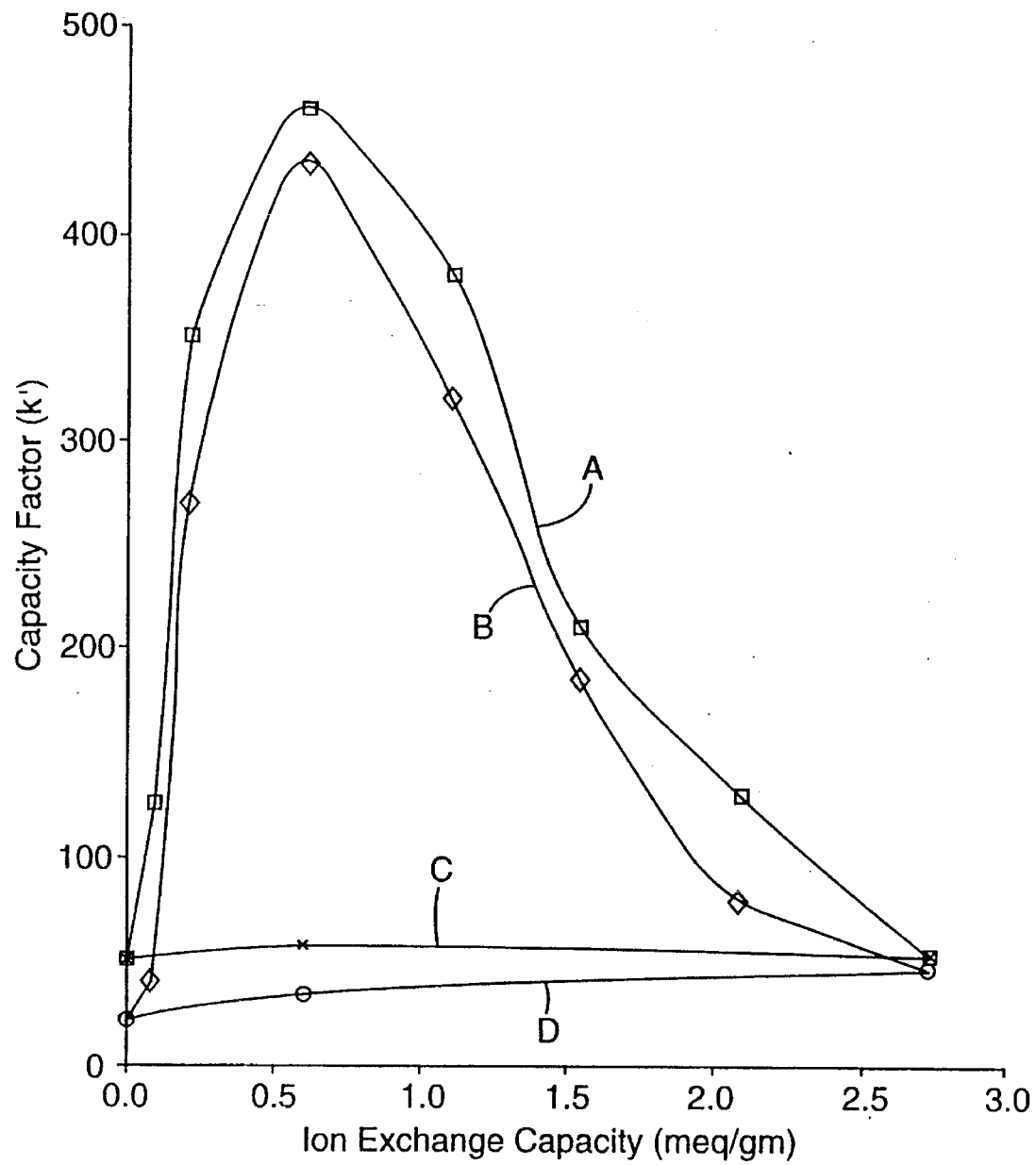

METHOD OF ISOLATING AN ANALYTE USING A SOLID PHASE EXTRACTION MEDIUM

This is a division of application Ser. No. 08/238,364 filed May 5, 1994, pending.

FIELD OF THE INVENTION

This invention relates to particles useful for solid phase extraction (SPE) processes, which particles have been partially chemically modified under controlled conditions to optimize sorptive properties. In another aspect, there are disclosed methods of making the particles and using the particles in packed columns and in composite sheet-like articles of the invention.

BACKGROUND OF INVENTION

Classical methods for separating analytes from water and other fluids use liquid/liquid extraction (LLE) procedures wherein the analyte is preferentially partitioned from an aqueous based liquid into an immiscible extraction liquid phase. Efficiency and selectivity of extraction of specific analytes by LLE is dependent on the partition coefficient of the analyte between the two liquids and is limited by the type of extraction liquid that can be used. Recently, solid phase extraction (SPE) procedures have been developed using solid particulate phases which can interact with the analyte by ion exchange, chelation, covalent bond formation, size exclusion, sorption, and other mechanisms to bind and remove the analyte from the fluid. SPE processes are described in Analytica Chimica Acta, 236, 157–164 (1990) and LC/GC, 9:5, 332–337 (1991). Application of mixed-mode SPE using copolymerized mixed-mode resins where $C_{18}$ (octadecyl) and sulfonic acid functional groups are in closer proximity than on "blended" mixed mode resins is reported in J. Chrom. 629 (1993) 11–21.

The type of SPE particulate chosen to effect separation of specific analytes can be inorganic, inorganic with organic coatings, inorganic with covalently bonded organic functional groups, polymeric organic resins and derivatives thereof.

U.S. Pat. No. 4,895,662 describes a process for purification of aqueous effluent from bleaching of wood pulp using macroporous adsorbent resins having been post-crosslinked in the swollen state and functionalized with hydrophilic groups prior to contact with the waste effluent.

U.S. Pat. Nos. 5,104,545 and 5,135,656 describe a process for removing water soluble metal salts of organic acids from oil field water using nonionogenic macroreticular adsorption resins such as XAD-16™ from Rohm and Haas Co., Philadelphia, Pa.

U.S. Pat. Nos. 5,071,565 and 5,230,806 describe neutral functionalized resins which take up organics by adsorption rather than ion exchange and teach that the amount of functional group relative to the amount of poly(styrene divinylbenzene) is not critical. They teach that the functional group must be neutral since anionic or cationic resins may pick up undesirable materials that are present. Utility of these resins for SPE of phenols was reported by J. S. Fritz et al. in J. Chrom. 641 (1993) 57–61.

U.S. Pat. No. 5,114,591 describes ion exchange resins for reducing organic material content of paint booth waste water having functional groups that provide ion exchange activity and also adsorb neutral molecules in varying degrees.

U.S. Pat. No. 5,236,594 describes a process for removing specific toxicants containing at least one carboxylate group from aqueous petroleum waste streams using non-ionic macroreticular polymeric resins.

U.S. Pat. No. 4,537,683 describes anion exchange particles alone or anion exchange particles combined with cation exchange particles in the form of a floc. It is reported that the level of ion exchange functionality has only a limited effect on the particles' ability to remove trihalomethane precursors.

U.S. Pat. No. 5,279,742 describes solid phase extraction media and methods using sorptive particulate in particulate loaded PTFE matrix sheet configurations wherein disks of the same or different compositions can be stacked to achieve separations.

A major requirement for particulate useful for SPE is that it has sufficient sorptive capacity to retain the analyte of interest. The retention characteristics of a specific analyte by a sorptive particulate is expressed numerically as its "capacity factor (k')", see "Contemporary Practice of Chromatography", C. F. Poole and S. A. Schuette, Elsevier, New York, N.Y. (1984) pp 2–6.

J. J. Sun and J. S. Fritz in J. Chrom. 522 (1990) 95–105 describe chemical modifications of polymeric resins to increase analyte capacity factor (k') for high performance liquid chromatography applications.

SUMMARY OF THE INVENTION

Briefly, the present invention provides a functionalized macroporous poly(styrene divinylbenzene) particle comprising ionic (cationic or anionic) functional groups covalently bonded thereto, the functionalized particle having sorptive capability towards an analyte, the functional group being present in a concentration range of 0.1 to 2.5 milliequivalents per gram of functionalized poly(styrene divinylbenzene).

Preferably, the functionalized particle exhibits a maximum range in retentive capacity for selected analytes dependent on the level of functional (i.e., substituted) group present.

Preferably, the analyte exhibits a maximum value of capacity factor (k') using functionalized poly(styrene divinylbenzene) particles in the specified exchange concentration range compared to a lesser value of capacity factor (k') for the same analyte for similarly functionalized particles present in an amount outside the ion exchange concentration range. Surprisingly, the maximum in retentive capacity is not coincident with the maximum possible concentration of the functional group. The particles are useful in solid phase extraction applications, both when packed in columns and when incorporated in fibrous membranes.

In another aspect, the functionalized particles of the invention comprising cationic or anionic functional groups in the ion exchange concentration range designated above, exhibit superior wetting properties towards liquids, preferably aqueous-based liquids, compared to functionalized particles comprising functional groups outside the designated ion exchange concentration range. Aqueous-based liquids include water, optionally in combination with at least one of miscible organic liquids and inorganic species.

In a further aspect, the solid phase extraction particles of the invention can be packed in a column or bed, or the particles can be incorporated into a porous fibrous membrane to provide a porous fibrous medium in sheet form, and one or a stack of such media can be useful in applications in separations science.

In yet another aspect, the present invention provides a method of optimizing sorptive properties wherein the capacity factor (k') of an analyte to be sorbed by functionalized poly(styrene divinylbenzene) particulate is maximized, the method comprising the step of providing a poly(styrene divinylbenzene) particle having covalently bonded thereto in the ion exchange concentration range of 0.1 to 2.5 milliequivalents of cationic or anionic functional groups per gram of functionalization. The analyte exhibits a maximum in capacity factor (k') with respect to poly(styrene divinylbenzene) functionalized in the specified concentration range compared to (k') of the same analyte for similarly functionalized poly(styrene divinylbenzene) outside the designated concentration range.

In another aspect, the invention relates to a method of removing an analyte in a concentrated form from a solution by contacting the functionalized particle of the invention with the analyte for a time and at a temperature sufficient to bind the analyte to the particle. In a further step of the method, the invention relates to regenerating the functionalized particle by removing the analyte in a concentrated form from the functionalized particle, preferably by eluting the analyte with a suitable solvent.

Functionalized particles are prepared from macroporous poly(styrene divinylbenzene) particulates, which are commercially available (see, for example, U.S. Pat. Nos. 4,501, 826, 4,382,124, 4,297,220, 4,256,840, and 4,224,415), and the functionalization is achieved by methods known in the art.

It is believed to be novel in the art that controlled levels of chemical alteration (functionalization) of sorptive particulate can provide optimum analyte retentive capacity and optimum wetting capability for particles used in solid phase extractions.

In this application:

"analyte" means the molecular species being isolated;

"capacity factor" (k') means a numerical measure of the retention characteristics of a specific analyte by a sorptive particulate (stationary phase). It is defined as the ratio of the time spent by the analyte in the stationary phase to the time it spends in the mobile phase as expressed in Equation 1:

$$k'=(t_r-t_m)/t_m \qquad \text{Equation 1}$$

where $t_r$ is the analyte retention time in a column and $t_m$ is the column dead time or the time of passage through the column of an unretained species; (k') varies with particle size, surface area, chemical functionality of the sorbent particulate, and composition of the mobile phase;

"degree of derivatization", "ion exchange capacity", and "capacity" are used interchangeably;

"derivative of" or "derivatized" or "functionalized" poly(styrene divinylbenzene) means poly(styrene divinylbenzene) having covalently bonded thereto at least one functional group which accepts protons or donates protons, which accepts electrons or donates electrons, or which shares electrons;

"hydrophilic" means having an affinity for, attracting, adsorbing, or absorbing water; preferably it means having a surface polarity of 0.5 or greater;

"hydrophobic" means lacking an affinity for, repelling, or failing to adsorb or absorb water; preferably it means having a low surface polarity, for example, in the range of 0.1 to less than 0.5;

"macroporous resin", also known as "macroreticular resin", means a member of a class of highly crosslinked polymer particles penetrated by channels through which solutions can diffuse; often used as ion exchangers. Pores are regions between densely packed polymer chains. Pores less than 50 Angstrom are referred to as micropores, pores between 50 to 200 Angstroms are referred to as mesopores, and pores greater than 200 Angstrom are referred to as macropores;

"nonpolar compound" means molecules which have no permanent electric dipole moment;

"normal phase system" means a process using a more polar stationary phase with a less polar moving phase to effect separation of molecular species;

"particle" or "particulate" means a regular or irregular shaped particle, having an average size in the range of 0.1 to 150 micrometers, preferably in the range of 1 to 30 micrometers, and more preferably in the range of 5 to 20 micrometers; also included is polymeric fiber pulp having a length in the range of 0.8 mm to 4.0 mm and an average diameter in the range of less than 1 to 20 μm;

"polar compound" means molecules which contain polar covalent bonds; they can ionize when dissolved; polar compounds include inorganic acids, bases, and salts;

"reversed phase system" means a process using a less polar stationary phase with a more polar moving phase to effect separation of molecular species;

"solid phase extraction" (SPE) means a process employing a solid phase for isolating classes of molecular species from fluid phases such as gases and liquids by sorption, ion exchange, chelation, size exclusion (molecular filtration), affinity, ion pairing, etc. mechanisms;

"sorptive" or "sorption" or "sorbent" means capable of taking up and holding by either absorption or adsorption;

"wettability" means the ability of any solid surface to be wetted when in contact with a liquid; that is, the surface tension of the liquid is reduced so that the liquid spreads over the surface; and "wetting" means treatment of hydrophobic particulate or medium with an organic solvent, usually methanol, to provide higher polarity to the surface making it more accessible to high surface tension fluids such as water.

One problem encountered in the prior art is that hydrophobic sorptive particulate in packed columns or in particle loaded web composites used for SPE of hydrophobic analytes in water require a preliminary "wetting" step with solvents such as methanol. Wetting is necessary because the low surface energy of the hydrophobic particles or composite does not allow high surface tension aqueous solutions efficient access to the high surface area of the sorptive particles' internal pores.

A number of approaches have been evaluated to increase the wettability or hydrophilicity of these particles and composites. One approach to eliminating or minimizing the wetting problem can be the addition of hydrophilic adjuvants such as micro-crystalline cellulose fibers to composite sheet articles comprising polytetrafluoroethylene polymer (PTFE) or other hydrophobic fibrils and various sorptive particulate, as described in U.S. Pat. No. 4,810,381. While this approach increases the overall hydrophilic character of the composite, it does not address wetting of the internal pores of entrapped sorptive particulate. Intramolecular introduction of hydrophilic groups, for example, on the macroporous poly(styrene divinylbenzene) resin particles of the invention provide "self wettability" of both external surfaces and available internal pore surfaces.

No prior art of which we are aware discloses that controlling the levels of ionic (cationic or anionic) chemical modification of poly(styrene divinylbenzene) taught by the instant invention can provide optimized capacity factor (k') for separations. There is no prior art evidence to suggest that specific concentration levels of functionalization of hydrophobic particles with hydrophilic groups will provide optimum SPE properties especially with respect to non-ionic neutral analytes. Indeed, intuition would lead one of ordinary skill in the art to believe that more functionalization is better. Surprisingly, the present invention shows that improved separations are realized at less-than-complete functionalizations/concentrations. While it is appreciated in the art that substitution of particles with hydrophilic groups improves particle wettability, it is an advance in the art to control the concentration of the hydrophilic groups to provide optimum wettability and analyte capacity factor (k').

BRIEF DESCRIPTION OF THE DRAWING

FIG. 1 is a series of four plots of phenol capacity factor (k') vs. ion exchange capacity of sulfonated poly(styrene divinylbenzene) resins.

DETAILED DESCRIPTION OF PREFERRED EMBODIMENTS OF THE INVENTION

The functionalized particles of the invention can be prepared from poly(styrene divinylbenzene) particles. Particularly preferred particulate are:

| Material | Average Particle size | Trademark | Available from |
| --- | --- | --- | --- |
| highly cross-linked styrene and divinyl-benzene co-polymers, high performance material* | 50–100 micrometers | Amber-chrom ™ CG-161 m | Supelco, Inc. Bellefonte, PA |
| highly cross-linked styrene and divinyl-benzene copolymer* | 220–830 micrometers (ground to average size about 50 micrometers) | Amberlite ™ XAD-2 | Supelco, Inc. Bellefonte, PA |
| highly cross-linked styrene and divinyl-benzene copolymer* | 5–20 micrometers | | Phenomenex, Inc., Torrance, CA Sarasep, Santa Clara, CA; Polymer Laboratories, Amherst, MA; Hamilton Co., Reno, NV |

*Disclosed in one or more of U.S. Pat. Nos. 4,501,826, 4,382,124, 4,297,220, 4,256,840, 4,224,415

The functionalized poly(styrene divinylbenzene) particles can be cation or anion exchange particles. Strong cation exchangers include the particles functionalized by, for example, strong acid sulfonate ($HSO_3$) groups which are anionic; weak cation exchangers include the particles functionalized by, for example, carboxylate (COOH) groups which are anionic. Other functionalized poly(styrene divinylbenzene) particles can be strong anion exchangers which include the base particles functionalized by, for example, quaternary ammonium groups $N^+(R)_3$ wherein each R independently can be $C_1$ to $C_4$ alkyl groups. Weak anion exchangers include aminated groups $N(R^1)_2$ wherein each $R^1$ independently can be hydrogen, or $C_1$ to $C_4$ alkyl or alkanol groups. Representative $N(R^1)_2$ groups include $NH_2$, $N(C_2H_5)_2$, $N(CH_3)_2$, and $N(C_2H_4OH)_2$, all of which are cationic.

In a preferred embodiment, the invention relates to poly(styrene divinylbenzene) particles which have been functionalized (i.e., chemically altered) by the addition of optimum levels of sulfonic acid groups to at least one of ortho and para positions on the aromatic ring structure of the resin. Ring substitution by functional groups occurs in accordance with known rules of organic chemistry, see for example Carl. R. Noller, "Textbook of Organic Chemistry" W.B. Saunders Company, Philadelphia, Pa. (1951) pp. 331–351. The functionalized particle can be prepared from the base particle which is mixed with glacial acetic acid and then reacted with concentrated sulfuric acid. The reaction can be quenched with water when the desired degree of sulfonation is achieved. Details of this method are disclosed in Example 1, below.

It has been found that functionalization of the particles in the ion exchange concentration range of 0.1 to 2.5 milliequivalents of covalently bonded ionic functionality per gram of functionalized polymer, preferably in the range of 0.15 to 2.0, more preferably in the range of 0.2 to 1.1 milliequivalents per gram, and most preferably in the ion exchange concentration range of 0.3 to less than 0.9 milliequivalents per gram and even more preferred 0.3 to 0.8, and the very most preferred about 0.3 to 0.6 milliequivalents per gram provides maximum retentivity of polar or semipolar analytes in solid phase extractions.

In one embodiment, the range of sulfonate chemical modification levels to improve particle wettability coincides with analyte capacity factor (k') enhancement to an optimum level of 0.6 milliequivalents per gram but further increased levels of sulfonate group substitution resulted in decreasing numerical values of the analyte capacity factor as shown in FIG. 1. This range of functionalization also provides optimization of wetting characteristics of the particles. In SPE, the sulfonate functionalized particles can be effective in the absence of a wetting agent.

In a second embodiment, carboxylate functional poly(styrene divinylbenzene) can be prepared for use in solid phase extractions. In one method, poly(styrene divinylbenzene) resin particles can be chemically altered by oxidation of pendant groups such as aromatic vinyl or aromatic alkyl groups to form carboxylate functional groups. Such oxidation can be performed as is known in the art, using, for example, oxidizing agents such as sodium hypochlorite, potassium permanganate, or dilute nitric acid, in amounts so as to control the level of conversion to carboxylate groups. See, for example, Lee, Donald G., "The oxidation of organic compounds by permanganate ion and hexavalent chromium", Open Court Publishing Company: La Salle, Ill., 1980, p. 43–64, and J. March, "Advanced Organic Chemistry 3rd Ed.", Wiley-Interscience: New York, 1985. In a second method, varying levels of carboxylate functionality can be obtained by copolymerization of styrene, divinylbenzene, and a suitable carboxylic acid functional monomer such as methacrylic acid. This second method has been described by R. Kunin in "Ion Exchange Resins", 2nd edition, Wiley: New York, (1958), p. 87, and by Meitzner et al., U.S. Pat. No. 4,256,840.

The ability of organic resins to sorb certain analyte molecules which are moderately water-soluble may be directly related to the hydrophilic/hydrophobic nature of the particulate. In the preferred embodiment, the hydrophilicity of poly(styrene divinylbenzene) particulate increases as more $SO_3^-$ substitution occurs but the effect on capacity factor (k') is surprising because sulfonation above about 0.6 milli-equivalent/gram results in a decrease in the capacity factor, (k'). Optimization of capacity factor (k') in the prior art involved choosing among various functionalized particulate. This invention teaches modification of the adsorptive character of a given particulate by controlled functionalization of the particulate with appropriate levels of certain functional groups.

Any of the particulate material may have a spherical shape, a regular shape or an irregular shape. Particulate material which has been found useful in the invention has an average size within the range of 0.1 to about 150 micrometers, preferably in the range of 0.1 to 100 micrometers, more preferably 1 to 100 micrometers, and most preferably 5 to 20 micrometers. It has been found advantageous in some instances to employ particulate materials in two or more particle size ranges falling within the broad range. As an example, particles of the present invention having an average size in the range of 0.1–30 micrometers having solid phase extraction capability may be employed in combination with particles having an average size in the range 1 to 150 micrometers acting as a property modifier. Larger particulate (e.g., 40 to 150 micrometers, even up to 4 mm or higher for industrial applications) are particularly desirable for packed columns and some nonwoven webs, particularly those disclosed in U.S. Ser. No. 07/929,985, now allowed, as U.S. Pat. No. 5,328,758.

As noted above, more than one type of functionalized poly(styrene divinylbenzene) particulate can be useful in columns and membranes of the present invention. The functionalized particles can be premixed in any proportion; the total functionalized SPE particles of this invention can be present in the range of more than 20 up to 100 weight percent of the total particles, preferably 35 to 100 weight percent, more preferably 50 to 100 weight percent organic polymeric particles, most preferably 90 to 100 weight percent derivatized organic polymeric particles of this invention, and 0 to 80 weight percent of total particulate of any other SPE particles, preferably 0 to 65 weight percent, and more preferably 0 to 50 weight percent, and most preferably 0 to 10 weight percent of other SPE particles. Other SPE particles include porous organic-coated or uncoated particles, and porous organic polymeric particles which can be functionalized or unfunctionalized.

In another aspect, the present invention provides an improved SPE composite structure and method therefor, the composite structure preferably being a uniformly porous composite sheet comprising sorptive particles of the invention distributed uniformly throughout a fibrous matrix formed of nonwoven fibers. In such a structure almost all of the particles are separate one from another and are entrapped in a matrix of fibers that restrains the particle. The preferred sheet of the invention has a thickness in the range of 125 to 10,000 micrometers. The ratio of total particles to fibrous matrix is in the range of 40:1 to 1:4, preferably 19:1 to 4:1, by weight.

In particle-loaded composite articles of the invention, property modifiers and adjuvants may be advantageously added to the primary particulate material in the fibrous medium to provide further improvement in or modification of properties. For example, modifier particulate can include inactive materials such as low surface area glass beads to act as property modifiers and processing aids. Coloring or fluorescing particulate can be added at low levels (up to 10 weight percent of particulate) to aid in visualizing sample components to be separated. Chemically active particulate adjuvants which indicate chemical activity or acidity of the sample components can be useful for diagnostic purposes.

When the present invention particles are incorporated into particle-loaded fibrous articles, which preferably are microfibrous articles, the articles comprise in the range of 20 to 80 volume percent fibers and particulate, preferably 40 to 60 volume percent fibers and particulate, and 80 to 20 volume percent air, preferably 60 to 40 volume percent air.

Fibrous matrices useful for incorporation of the particulate of the invention include nonwoven webs, such as nonwoven polymeric webs including polytetrafluoroethylene (PTFE), polyolefins such as polyethylene or polypropylene, polyaramid (e.g., Kevlar™, Dupont), polyamides such as nylon 6 and nylon 66, polyurethanes, polyesters such as polyethylene terephthalate, polyacrylonitrile (Cyanamid, Wayne, N.J.); other nonwoven webs include glass fiber webs and ceramic fiber webs.

PTFE provides a particularly useful fibrillated matrix for the present invention derivatized particulates. The composite article can be prepared, for example, by the methods disclosed in any of U.S. Pat. Nos. 4,810,381, 4,985,296, 5,071,610, 5,279,743, and 4,985,296.

Other webs useful for incorporating particles of the present invention include nonwoven macro- and microfibrous webs such as melt-blown webs, spunbonded or air-laid webs, blown fibrous webs, as disclosed in U.S. Ser. No. 07/929,985, now allowed, as U.S. Pat. No. 5,328,758, which is incorporated herein by reference for making and using such webs. Pressing or fusing of the webs is generally not required in the articles of the present invention. Also useful can be glass fiber or ceramic fiber webs.

The particulate-containing fibrous webs of the invention can be useful in a first mode wherein the composite article of the invention is used for preconcentration and isolation of certain materials for further analysis by, for example, high resolution column chromatography. In this mode, which is well known in the art and commonly called solid phase extraction, solvent and sample flow are introduced at an angle of about 90 degrees to the surface of the sheet. This is a conventional configuration and the separation path length is equal to the thickness of the sheet. The path length can be increased by stacking additional layers (media) which may be the same or of different composition but the individual layers need not be intimately bound together. This mode is effective for one step or multi-step adsorption-desorption separations. This mode is effective using sorptive ion exchange particulate in the normal or reverse phase modes. The article strongly adsorbs the analyte of interest onto the active particulate in the composite and undesirable components are washed out with a first eluant. Conversely, undesirable components can be strongly bound and the analyte can be washed out with the first eluant. A more effective eluting solvent is then used to displace the desired component from the particulate allowing it to be recovered in a more concentrated and unified form.

The composite extraction articles of the invention can be of a variety of sizes and shapes. Preferably the articles can be sheet-like materials which, for example, can be in disk or strip form.

This invention discloses a solid phase extraction (SPE) disk/sheet composite material and a method which is effective, for example, in isolating polar, semipolar, and nonpolar organic contaminants from fluids (gases and liquids). The article can be used as a single self-supporting sheet, or a combination of sheets to form a stack, or as a composite film adhered to supports, such as glass, paper, metals, or polymers. The article is preferred for polar and semi-polar analytes. In particular, residues of explosives, phenolic compounds, and organic acids are common contaminants of solids, air, and water, and can be efficiently removed, concentrated, or isolated using the teachings of the present invention. The isolations can be performed on an analytical scale or in large scale applications.

Analytes which are nonpolar, i.e., minimal dipole moment, are hydrophobic and usually exhibit high capacity factor (k') levels with hydrophobic sorptive particles such as $C_{18}$ bonded silica and neutral macroporous resins such as poly(styrene divinylbenzene). Using the functionalized particles of the present invention, these non-polar analytes are not expected to exhibit substantial increases in (k') values compared to those (k') increases found for polar and semi-polar analytes. Some elevation of capacity factor (k') can occur due to increased surface area available from access to wetted internal pores.

Representative polar and semi-polar compounds (analytes) which can be sorbed by the functionalized particles of the present invention include explosives such as 1,3,5,7-tetranitro-1,3,5,7-tetraazacyclooctane (HMX), explosive impurities such as dinitrotoluene, and phenolic compounds such as phenol, 2-chlorophenol, 4-chlorophenol, o- or p-cresol, 2- or 4-nitrophenol, 4,6-dinitro-o-cresol, 2,4-dinitrophenol, 2,4-dimethylphenol, 4-chloro-3-methylphenol, 2-methyl-4,6-dinitrophenol, pentachlorophenol, 2,4-dichlorophenol, 2,4,5-trichlorophenol, and 2,4,6-trichlorophenol, and catechol, which are pollutants in water and which are of environmental concern. Representative pesticides, generally considered semi-polar compounds, which can be recovered from aqueous liquids include atrazine, alachlor, and diazinon. Representative drugs, generally considered semi-polar compounds, include d-amphetamine, methamphetamine, salicylate, ibuprofen, butalbital, acetaminophen, amobarbital, pentobarbital, secobarbital, glutethimide, phencyclidine (PCP), phenobarbital, naproxyn, methadone, methaqualone, propoxyphene, cocaine, imipramine, desipramine, phenytoin, codeine, morphine, and flurazepam.

Neutral analytes such as ethyl pyruvate and butanedione exhibit a maximum capacity factor within the concentration range of the invention. These compounds are commonly extracted from water using liquid/liquid extractions (LLE), described in EPA Method 608, 625, etc. It is highly desirable to replace liquid-liquid extraction (LLE) methods with solid phase extraction (SPE) materials and methodology to reduce or eliminate extraction solvent usage, extraction time, and environmental hazards. This aspect of the invention discloses using a hybrid of column particle and membrane technologies to provide a means of overcoming the deficiencies of conventional methods with substantial savings in time and cost.

It has been found advantageous where combinations of contaminants are to be extracted to use a stack of disks (e.g., 2 to 5 or more) with one or more types of particulate chosen, each having optimum extraction or reaction efficiency for individual contaminants. Choice of elution solvents depends on contaminants and extraction particulate.

This invention is useful in the extraction of inorganic and organic substances from liquids and gases in a flow-through or filtration mode. The invention can be used on an analytical scale, as in the testing of water samples for environmental pollutants. This invention can also be used on a larger scale as in the remedial removal of contaminants or analytes from liquid or gas sources.

After use, the article can be recycled by simply eluting the sorbed pollutants from the article using a liquid capable of removing the sorbed materials from the sorbent. Heat or supercritical fluid displacement or elution of the sorbed analyte can also be used.

Particles which can be loaded in a packed column and composite articles of the invention have utility in a wide variety of separations wherein the choice of the particulate material is useful for size controlled filtration or steric exclusion, for simple one step or multistep sorption-desorption separations of specific components, for applications where sorptive particulate perform chemical or biochemical separations, for ion-exchange conversions of cations and anions, for purification of materials, and for chromatographic separations and analyses in both passive and forced flow modes, for hydrophobic reverse phase and normal phase chromatography, all being processes which are known to those skilled in the art.

Objects and advantages of this invention are further illustrated by the following examples, but the particular materials and amounts thereof recited in these examples, as well as other conditions and details, should not be construed to unduly limit this invention.

EXAMPLES

Example 1

Chemical modification of poly(styrene divinylbenzene)

A first procedure utilized 2 gram portions of 8 micrometer poly(styrene divinylbenzene)(SDVB) resin particulate from Sarasep, Santa Clara, Calif. Eight resin samples were each mixed with 2 milliliters of glacial acetic acid to form a slurry. Concentrated sulfuric acid was added sequentially in fifty milliliter portions to each of these slurries and allowed to react at different temperatures and for different times. The reactions were then quenched by dilution of the sulfuric acid in the mixture with water and the resin particles were separated by filtration. After washing with water and drying, the degree of sulfonation of each sample was determined by titration with a standard solution of sodium hydroxide to determine ion exchange capacity in milliequivalents per gram. Reaction times, temperatures, and exchange capacity in milliequivalents per gram are listed for these samples in Table 1.

TABLE 1

Sulfonation levels of poly(styrene divinylbenzene)

| Sample No. | Reaction Time (minutes) | Temperature (degrees C) | Ion Exchange Capacity (meq./gm) |
| --- | --- | --- | --- |
| 1 (comparative a) | — | — | 0.0 |
| 2 | 0.5 | 0 | 0.1 |
| 3 | 2 | 0 | 0.4 |
| 4 | 4 | 0 | 0.6 |
| 5 | 10 | 25 | 1.0 |
| 6 | 20 | 25 | 1.2 |
| 7 | 90 | 25 | 1.5 |
| 8 | 90 | 50 | 2.1 |
| 9 (comparative b) | 90 | 85 | 2.7 |

Sample 1 (comparative a) was unfunctionalized poly(styrene divinylbenzene) starting material and Sample 9 (comparative b) represented a typical strong cation exchange resin which had been heavily sulfonated (ion exchange capacity outside the present invention concentration range).

A second procedure for chemically modifying poly(styrene divinylbenzene) comprised mixing 5 ml of glacial acetic acid and 5 ml of concentrated $H_2SO_4$ with a sample of the base resin. A 60-minute reaction at room temperature produced a dark orange resin, but it was not wettable. Finally a reaction time of 5–10 minutes was used with heating (100°–150° C.). These resins were dark brown and wettable by aqueous solutions. The final resin with a capacity of 0.7 meq $SO_3^-$/g was made by the following conditions:

Two g. of macroporous poly(styrene divinylbenzene) resin (Sarasep, Inc.) were dried with gentle heat (100° C. for 5–10 minutes). Glacial acetic acid (5 mL) was added and the mixture was placed in an oil bath at 150° C. Concentrated $H_2SO_4$ (5 mL) was added and the mixture was vigorously stirred with a cross-shaped magnetic bar for 5 minutes. The reaction was quenched by pouring the mixture into 100 mL of cool $H_2O$. The aqueous mixture was filtered and rinsed with successive 100 mL portions of deionized water, acetone, and methanol. The functionalized polymeric resin was then dried at approximately 100° C. for several hours.

The resin was pre-wetted with methanol and then solid phase extraction of several phenols was performed with this resin (50 mg of resin particles packed in a small SPE column (20 mm×2.1 mm ID). Each phenol was present in 15 mL of $H_2O$. After SPE was performed, each phenol was eluted with 1 mL of methanol. Recoveries (average of three trials) are listed below in Table 2.

TABLE 2

SPE of Phenols Using Sulfonated Resin

| Compound | Percent Recovery |
| --- | --- |
| phenol | 95% |
| 2-chlorophenol | 96 |
| 4-chlorophenol | 93 |
| p-cresol | 92 |
| 2,3-dichlorophenol | 82 |

Example 2

Capacity factor (k') vs ion exchange capacity

Samples 1 through 9 listed in Table 1 were packed into a column to evaluate the effect of various levels of sulfonation of the poly(styrene divinylbenzene) on sorptive capacity. A series of relatively hydrophilic compounds including phenol, catechol, ethyl pyruvate (a neutral ester), and 2,3-butanedione (a neutral ketone) were then passed through the column without methanol pre-wetting to determine capacity factors (k'). Data obtained is listed in Table 3.

TABLE 3

Analyte Capacity Factors with Unwetted Particles

| | | Capacity Factor (k') | | | |
| --- | --- | --- | --- | --- | --- |
| Sample | Capacity* | Phenol | Catechol | Ethyl pyruvate | Butane-dione |
| 1 | 0.0 (comparative) | 21 | 1 | 0 | 1 |
| 2 | 0.1 | 40 | 1 | 0 | 0 |
| 3 | 0.4 | 272 | 34 | 40 | 3 |
| 4 | 0.6 | 436 | 60 | 60 | 12 |
| 5 | 1.0 | 315 | 59 | 54 | 8 |
| 6 | 1.2 | 290 | 56 | 38 | 7 |
| 7 | 1.5 | 183 | 38 | 26 | 6 |
| 8 | 2.1 | 80 | 16 | 9 | 3 |
| 9 | 2.7 (comparative) | 47 | 10 | 5 | 2 |

*$SO_3^-$ ion exchange capacity in milli-equivalents/gram from Table 1.

Example 3

Capacity factor (k') vs ion exchange capacity

Examination of data in Table 3 shows that the capacity factor (k') in each case reached a maximum value when the ion exchange capacity was about 0.6 milliequivalents per gram. A second trial was performed using the particulate wetting procedure described by Hagen et al., Analytica Chimica Acta, 236 (1990) 157–164, and the results are shown in Table 4.

TABLE 4

Analyte Capacity Factors With Wetted* Particles

| | Ion Exchange Capacity** | Capacity Factor (k') | | | |
| --- | --- | --- | --- | --- | --- |
| Sample | | Phenol | Catechol | Ethyl pyruvate | Butane-dione |
| 1 | 0.0 (comparative) | 49 | 10 | 0 | 1 |
| 2 | 0.1 | 124 | 32 | 4 | 2 |
| 3 | 0.4 | 350 | 45 | 49 | 4 |
| 4 | 0.6 | 457 | 90 | 79 | 14 |
| 5 | 1.0 | 381 | 70 | 55 | 8 |
| 6 | 1.2 | 324 | 78 | 57 | 7 |
| 7 | 1.5 | 209 | 45 | 34 | 6 |
| 8 | 2.1 | 127 | 25 | 16 | 4 |
| 9 | 2.7 | 55 | 12 | 6 | 2 |

*particulate wetted with methanol
**$SO_3^-$ ion exchange capacity in milli-equivalents/gram Examination of data in Tables 3 and 4 show that the capacity factor (k') for the ester, ketone and phenolics in each case reached a maximum value when the ion exchange capacity was about 0.6 milli-equivalents per gram of particulate.

FIG. 1 illustrates graphically the optimization of the capacity factor (k') by controlling the degree of sulfonation of the particulate.

It is important to note that the unfunctionalized particulate gives a low value for the capacity factor (k'). The poly(styrene divinylbenzene) particulate that was more highly sulfonated and is typical of a cation exchange resin of prior art also gave a low value for the capacity factor (k'). The maximum capacity factor (k') value occurred at about 0.6 milliequivalents/gram for the sulfonated particle but can vary for other functional groups such as the acetyl or hydroxyl groups which increase wettability.

More particularly, in the Drawing, FIG. 1 shows four plots from data of Table 6 of phenol capacity factor (k') vs. ion exchange capacity of poly(styrene divinylbenzene) resins.

More specifically, in each run the particles were 5–8 micrometer average diameter and were packed in a column 20 mm×2.1 mm ID. Plot A shows data of a run using methanol wetted sulfonated poly(styrene divinylbenzene) particles (sample 4 of Table 1); plot B shows data of a run using non-wetted sulfonated poly(styrene divinylbenzene) particles (sample 4 of Table 1); plot C shows data of a run using a mixture (sample 10b of Table 6) of sulfonated poly(styrene divinylbenzene) particles (sample 9 of Table 1) and unfunctionalized poly(styrene divinylbenzene) particles (sample 1, Table 1), the particles having been wetted with methanol before the run; plot D shows data of a run using a mixture of non-wetted sulfonated poly(styrene divinylbenzene) particles (sample 9 of Table 1) and unfunctionalized poly(styrene divinylbenzene) particles (sample 1, Table 1). Plots A, B, C, and D show that there is a maximum capacity factor (k') achieved when the ion exchange capacity of the derivatized poly(styrene divinylbenzene) is in the range of 0.1 to 2.5 milliequivalents, preferably 0.15 to 2.0 milliequivalents per gram, and more preferably 0.2 to 1.1 milliequivalents. For wetted and non-wetted particles, there is a maximum capacity for phenol achieved when the ion exchange capacity of the functionalized poly(styrene divinylbenzene) is in the range of 0.1 to 2.5 milliequivalents per gram of functionalized poly(styrene divinylbenzene), preferably 1.5 to 2.0 and most preferably 0.2 to 1.1 milliequivalents per gram. Wetted particles provide optimal capacity factor (k') of functionalized poly(styrene divinylbenzene) particles. As shown by plots C and D, a mixture of functionalized and non-functionalized particles provided very little increased capacity factor (k') with increase in ion exchange capacity, although the wetted particles showed some benefit in capacity factor (k') compared to a mixture of non-wetted particles.

Example 4

PTFE composite membranes comprising 80% of sample 4 sulfonated poly(styrene divinylbenzene) (0.6 meq/gm ion exchange capacity) and 20% by weight PTFE were evaluated for their ability to extract a series of phenolic compounds listed in Table 5 below. The recoveries obtained were compared to those obtained for PTFE composite membranes comprising 20 weight percent PTFE and 80 weight percent AmberChrome 71 resin, which was disclosed in U.S. Pat. No. 5,279,742, as a desirable sorptive particle. One hundred parts per billion by weight of each phenol were prepared in a 500 milliliter volume of deionized water. The pH was adjusted to 2.0 with HCl and 10% by weight NaCl was added to help salt out the soluble phenols from the aqueous phase to the sorptive solid phase. This procedure is well known in the art. Lowering the pH assures that the phenols are protonated for better transfer to the hydrophobic SPE media.

The water sample containing the phenolic analytes was pulled through the SPE membrane (47 mm diameter) using a standard filtration apparatus (Millipore Corp., Bedford, Mass.) with water aspirator vacuum of 66 cm (26 inches) of Hg. After the extraction step, the phenolic analytes were eluted from the membrane with 3 successive 3 mL aliquots of tetrahydrofuran (THF). The 3 aliquots were combined and THF was added to give a final volume of 10 milliliters for analysis by liquid chromatography. The analytical results listed in Table 5 are an average of 4 determinations for the sulfonated poly(styrene divinylbenzene) and 3 determinations for the AmberChrom 71.

TABLE 5

Recovery Data for the SPE of Phenols

| Compound | Percent Recovery | |
|---|---|---|
| | Sulfonated poly (styrene divinylbenzene) (0.6 meq/gm) | AmberChrom 71 |
| phenol | 79.0 | 9.6 |
| 4-nitrophenol | 94.7 | 27.2 |
| 2,4-dinitrophenol | 85.4 | 26.9 |
| 2-nitrophenol | 65.8 | 16.7 |
| 2,4-dimethylphenol | 72.4 | 20.7 |
| 4-chloro-3-methylphenol | 85.1 | 28.7 |
| 2-methyl-4,6-dinitrophenol | 79.5 | 33.6 |
| 2,4,6-trichlorophenol | 75.9 | 30.0 |
| pentachlorophenol | 96.1 | 37.2 |

The data show the recoveries obtained for the sulfonated poly(styrene divinylbenzene) were considered very good for these phenols compared to those obtainable using a conventional sorptive particulate, AmberChrom 71.

Example 5

Capacity factor (k') for phenol versus degree of sulfonation of poly(styrene divinylbenzene) sorbent Data in Table 6 (which contains data of Tables 3 and 4, columns 1–3 for samples 1–9) show that an optimum capacity factor (k') can be achieved by controlled functionalization of the poly(styrene divinylbenzene) polymer particles. In additional trials, simple mixtures of the un-sulfonated (neutral) particles and heavily sulfonated particles (strong cation exchange) as illustrated by samples 10a, 10b, and 10c did not achieve optimization of the capacity factor (k') as shown by samples 1–9.

TABLE 6

Capacity factor (k') for phenol vs. degree of sulfonation of poly(styrens divinylbenzene) sorbent

| Sample number | Ion Exchange Capacity (meq. $SO_3^-$/gm) | $CH_3OH$ Wetted (k') | Non-wetted (k') |
|---|---|---|---|
| 1[(a)] | 0.0 | 49 | 21 |
| 2 | 0.1 | 124 | 40 |
| 3 | 0.4 | 350 | 272 |
| 4 | 0.6 | 457 | 436 |
| 5 | 1.0 | 381 | 315 |
| 6 | 1.2 | 324 | 290 |
| 7 | 1.5 | 209 | 183 |
| 8 | 2.1 | 127 | 80 |
| 9[(a)] | 2.7 | 55 | 47 |
| 10a*[(a)] | 0.0 | 50 | 21 |
| 10b** | 0.6 | 56 | 33 |
| 10c*[(a)] | 2.7 | 53 | 47 |

[(a)]comparative
*second trial of samples 1 and 9 respectively to compare (k') of mixtures
**mixture of portions of samples 10a and 10c give sample 10b with a net ion exchange capacity of 0.6 meq $SO_3^-$/gm Example 6

A. Samples of macroporous poly(styrene divinylbenzene) resins with various concentrations of carboxylic acid functionality (a weak cation exchange group) were prepared as described by R. Kunin in "Ion Exchange Resins", 2nd edition, Wiley: New York, (1958) p. 87, and by Meitzner et al. in U.S. Pat. No. 4,256,840 wherein the ion exchange capacities were varied by changing the ratio of methacrylic acid, divinylbenzene and styrene starting monomers. These samples with ion exchange capacities ranging from 0 for non-carboxylated base poly(styrene divinylbenzene), to 0.3, 2.9, and 5.8 milliequivalents per gram for carboxylated resins, were incorporated into 0.5 mm thick PTFE sheet material comprising 20 percent PTFE and 80 percent by weight of each resin particulate using a process described in U.S. Pat. No. 5,147,539. Forty seven millimeter diameter disks were cut from these sheet materials and the particle loaded disks comprising particles with varying ion exchange capacities were individually tested for SPE efficiency using the phenolic analytes listed in Table 5.

In these trials, 500 milliliter test samples containing a mixture of 100 parts per billion (100 μg per liter) of each phenolic analyte in distilled water were adjusted to a pH of 2 with hydrochloric acid. (Acidification is often used to suppress ionization and keep the phenolic analyte in the protonated form to enhance extractability by reverse phase particulate.) Samples were pulled through the disks mounted in a standard Millipore™ filtration apparatus using a vacuum of 66 cm (26 inches) Hg. Phenolic analytes adsorbed from these water samples by the resin loaded disks were subsequently desorbed i.e., eluted from the disks using 2 sequential 10 milliliter portions of tetrahydrofuran (THF) which were then combined and brought to 25 milliliter analytical volumes with THF. These eluant solutions were analyzed by liquid chromatography to measure the phenolic analyte content to determine the percent recovery obtained by the SPE process. The data is shown in Table 7A, below.

0.3 milli-equivalents per gram ion exchange capacity level of carboxylate group. Recovery levels for 4-nitrophenol subsequently decreased when higher levels of carboxyl groups were present. Recoveries of the 2-nitrophenol isomer were consistently high regardless of the level of carboxylate group substitution. This is not unexpected since the close proximity of the nitro and phenol groups favors intramolecular hydrogen bonding and results in decreasing water solubility. The 2,4-dinitrophenol analyte recoveries were higher than those found for 4-nitrophenol but also decreased with increasing levels of carboxylate substitution of the sorptive resin particulate.

B. In another set of trials, a series of partially carboxylated copolymer resin particulates were prepared via the method as described by Kunin (see Example 6A) using various levels of methacrylic acid monomer. These resin particles were incorporated into PTFE membranes comprising 80 weight percent particles and 20 weight percent PTFE as described above. The resulting composite articles were evaluated for sorptive properties using polar probe compound analytes; phenol, 4-nitrophenol, and neutral probe analytes: dimethyl phthalate (DMP), diethyl phthalate (DEP), dibutyl phthalate (DBP), dioctyl phthalate (DOP), and o-methyl anisole (OMA) (an ether). Experimental procedure was the same as for Table 7A, except that the analytes were present at 5 parts per million (5 mg per liter) and methanol was present at two percent by volume due to sample preparation procedures. The data of Table 7B show the percent recoveries obtained. Maxima occurred at the level of 0.3 milliequivalent carboxylate functionality per gram of copolymer resin for phenol and 4-nitrophenol. The

TABLE 7A

Percent Recovery of Phenols vs Ion Exchange Capacity of Carboxylated SDB Copolymer Resin

| Exchange Capacity (meq/gm) | phenol | 4-nitro phenol | 2,4-dinitro phenol | 2-nitro phenol | 2,4-dimethyl phenol | 4-chloro, 3-methyl phenol | 2,4-dichloro phenol | 2,4,6-trichloro phenol | pentachloro phenol |
|---|---|---|---|---|---|---|---|---|---|
| 0* | 7.0 | 37.0 | 105.4† | 104.1† | 108.3† | 85.6 | 91.9 | 102.1† | 93.2 |
| 0.3 | 16.4 | 94.1 | 99.7 | 98.0 | 104.9† | 83.2 | 89.7 | 96.8 | 91.8 |
| 2.9 | 12.5 | 60.5 | 89.0 | 90.1 | 92.0 | 73.9 | 83.8 | 91.1 | 94.8 |
| 5.8 | 10.1 | 45.6 | 78.5 | 93.4 | 87.2 | 80.2 | 91.9 | 102.1† | 93.2 |
| Average % RSD** | 13.4 | 3.0 | 2.6 | 2.7 | 4.0 | 5.4 | 4.3 | 4.6 | 3.6 |

*represents comparative sample of unfunctionalized poly(stryene divinylbenzene)
**relative standard deviation
†recoveries above 100% represent experimental scatter Data in Table 7A indicate that good recoveries were found for the less polar phenolics tested (i.e., 2-nitrophenol, 2,4-dimethyl phenol, 4-chloro-3-methyl phenol, 2,4,6-trichlorophenol, and pentachlorophenol) with little dependence on the level of carboxyl groups present on the poly(styrene divinylbenzene)sorbent. Better recoveries were obtained for the more polar phenolic analytes (phenol and 4-nitrophenol). In particular, phenol and 4-nitrophenol exhibited a definite maximum percent recovery with the resin sample which had phenol and 4-nitrophenol analytes are polar and showed low capacity factors (k') which gave lower percent recovery levels using the poly(styrene divinylbenzene) copolymer resin based particles. The phthalate esters and o-methyl anisole are neutral analytes and had high capacity factors (k') as shown by the near 100 percent recovery levels, and no effect on recovery levels was observed with different levels of carboxylate functionality.

TABLE 7B

Percent Recovery vs. Ion Exchange Capacity of Carboxylated Poly(styrene divinylbenzene) Copolymer Resin

| | Exchange Capacity meq/gm | phenol | 4-nitrophenol | DMP | DEP | DBP | DOP | OMA |
|---|---|---|---|---|---|---|---|---|
| 1 | 0.0 | 3.4 | 13.2 | 99.6 | 99.3 | 98.4 | 98.6 | 96.8 |
| 2 | 0.3 | 4.8 | 19.8 | 100.6 | 99.8 | 99.1 | 98.1 | 96.9 |

TABLE 7B-continued

Percent Recovery vs. Ion Exchange Capacity of
Carboxylated Poly(styrene divinylbenzene) Copolymer Resin

| Exchange Capacity meq/gm | phenol | 4-nitrophenol | DMP | DEP | DBP | DOP | OMA |
|---|---|---|---|---|---|---|---|
| 3 | 0.6 | 3.5 | 14.3 | 100.1 | 99.2 | 98.7 | 98.2 | 96.2 |
| 4 | 0.9 | 3.3 | 14.4 | 100.0 | 99.6 | 98.9 | 98.3 | 96.6 |
| 5 | 1.5 | 4.1 | 16.3 | 99.3 | 99.3 | 98.0 | 97.4 | 95.8 |

It is recognized in the art that analyte capacity factor (k') values are directly proportional to analyte recovery levels in SPE processes. Data of Tables 7A and 7B show that controlling the level of carboxyl functionality on poly(styrene divinylbenzene) copolymer resin can be used to maximize extractability of certain analytes.

Example 7

Comprehensive Serum and Urine Drug Screens

Disks comprising 20 percent PTFE and 80 percent sample number 4 from Table 3, Example 2 (poly(styrene divinylbenzene) particulate functionalized with sulfonate functional group at an ion exchange capacity of 0.6 meq/gm) were tested in a comprehensive drug screening procedure. The results were compared with data obtained using disks comprising 20 percent PTFE and 80 percent Clean Screen™ (CS) particulate from United Chemical Technology, Bristol, Pa. (commercially available silica based particles coated with a mixed phase comprising an octyl reverse phase group and a strong cation exchange functionality). Results were also compared with data obtained using TOXI-TUBEs for acidic and basic drug extractions from urine, commercially available from Toxi-Lab, Inc., Irvine, Calif.

Materials and Methods
  Drug Standards
  Stock standard solution used was 100 µg/mL of each of the following drugs in methanol:

| d-amphetamine | naproxyn |
| methamphetamine | methadone |
| salicylate | methaqualone |
| ibuprofen | propoxyphene |
| butalbital | cocaine |
| acetaminophen | imipramine |
| amobarbital | desipramine |
| pentobarbital | phenytoin |
| secobarbital | codeine |
| glutethimide | morphine |
| phencyclidine (PCP) | flurazepam |
| phenobarbital | |

Internal standard solution used was 0.5 mg/mL cyheptamide in methanol.

Extraction Procedure—Extraction Disk Cartridges (3M Co., St. Paul, Minn.), (Columns B and C in Table 8)

1. Samples were prepared as follows:
  Urines: Sequentially were added 3 mL distilled water, 2 mL 0.1M phosphate buffer (pH=6.0), and 10 µL of internal standard solution to 2 mL of urine (spiked with an appropriate amount of drug standard). Samples were thoroughly shaken.
  Serums: Sequentially were added 4 mL distilled water, 2 mL 0.1M phosphate buffer (pH=6.0), and 10 µL of internal standard solution to 1 mL of serum (spiked with an appropriate amount of drug standard). Samples were thoroughly shaken.

2. The extraction disk cartridge was conditioned with sequential additions of one 3-mL volume of methanol, one 3-mL volume of distilled water, and one 1-mL volume of 0.1M phosphate buffer (pH=6.0). Each addition was aspirated but the disk was not allowed to dry.

3. Sample was applied and aspirated at full vacuum.

4. Disk cartridge was washed with one 3-mL volume of distilled water followed by one 1-mL volume of 1.0M acetic acid. Disk cartridge was dried at full vacuum for 5 minutes, then washed with one 2-mL volume of hexane.

5. Elution of acidic and neutral drugs was accomplished using one 3-mL volume of hexane/ethyl acetate (50/50); the eluate was collected at less than 5 mL/minute, then transferred into a conical bottom dry down tube.

6. The disk cartridge was washed with one 3-mL volume of methanol and dried at full vacuum for 5 minutes.

7. Basic drugs were eluted with one 2-mL volume of elution solvent (24 mL methylene chloride, 6 mL isopropanol, and 0.9 mL ammonium hydroxide; made fresh daily). Eluate was transferred into the same tube as the previous eluate.

8. The eluate sample was concentrated by drying under a gentle stream of compressed air without heating. When completely dry, 150 µL of chloroform was added to the residue and the sample was thoroughly mixed.

9. Sample was analyzed by injecting 1 µL of chloroform solution containing the analytes into a chromatograph.

Extraction Procedure—Liquid-Liquid Extraction for Urines (Columns D and E in Table 8)

1. Each extraction tube was prepared by adding 2 mL of urine (spiked with an appropriate amount of drug standard) and 10 µL of internal standard solution (described above) to TOXI-TUBEs (basic and acidic extractions).

2. Contents of each extraction tube was mixed by gentle inversion for a minimum of five minutes.

3. The tube was centrifuged at high speed for 5 minutes.

4. The organic layer was transferred to conical bottom dry down tube.

5. The sample was concentrating drying the organic layer under a gentle stream of compressed air without heating. When completely dry, 150 µL of chloroform was added to the residue and the tube was shaken.

6. The sample was analyzed by injecting 1 µL of chloroform containing the analytes into a chromatograph.

Extraction Procedure—Liquid-Liquid Extraction for Serum (Column A in Table 8)
  Stock Solution A:
  Ammonium sulfate crystals were washed twice with methanol and dried at 100° C. for several hours. A supersaturated solution of the crystals was prepared in distilled water. Twenty mL of concentrated hydrochloric acid was then mixed with 250 mL of the supersaturated ammonium sulfate solution.

1. Each extraction tube was prepared by adding 0.4 mL of Stock Solution A with 10 µL of internal standard (described above), to 1 mL of serum (spiked with an appropriate amount of drug standard). Nine mL of methylene chloride extraction solvent were then added.

2. The tube was shaken for 5 to 10 minutes.

3. The tube was centrifuged at high speed for 5 minutes.

4. The methylene chloride layer was transferred to a conical bottom dry down tube.

5. The sample was concentrated by evaporating the methylene chloride extraction solvent using a gentle stream of compressed air. When completely dry, 150 µL of chloroform were added to the extracted residue and the sample was thoroughly mixed.

6. Analyze sample. One (1) µL of chloroform containing the analytes was injected into a chromatograph for analysis.

TABLE 8

| Drug | Serum Extractions | | | Urine Extractions | | | |
|---|---|---|---|---|---|---|---|
| | $A^{(a)}$ Liquid/ Liquid | $B^{(a)}$ Clean Screen ™ | C SCX/SDB | D Toxi-Tube ™ $^{(a)}$ Basic | E Toxi-Tube ™ $^{(a)}$ Acidic | B Clean Screen ™ | C SCX/SDB |
| d-amphetamine | − | + | + | − | − | + | + |
| methamphetamine | − | + | + | − | − | + | + |
| ibuprofen | + | − | − | − | − | − | + |
| butalbital | + | + | + | + | + | + | + |
| amobarbital | + | + | + | + | + | + | + |
| pentobarbital | + | + | + | + | + | + | + |
| secobarbital | + | + | + | + | + | + | + |
| glutethimide | + | + | + | + | + | + | + |
| phencyclidine | + | + | + | + | + | + | + |
| phenobarbital | + | − | + | + | + | − | + |
| methadone | + | + | + | + | + | + | + |
| methaqualone | + | + | + | + | + | + | + |
| propoxyphene | + | + | + | + | + | + | + |
| cocaine | + | + | + | + | − | + | + |
| imipramine | + | + | + | + | + | + | + |
| desipramine | − | + | − | + | − | − | + |
| phenytoin | + | + | + | + | + | + | + |
| codeine | + | + | + | + | − | + | + |
| morphine | − | + | + | + | − | + | + |
| flurazepam | + | + | + | + | − | + | + |

$^{(a)}$comparative
A Liquid/Liquid extraction - conventional method
B Clean Screen - particle loaded web as a disk in a cartridge format
C SCX/SDB - present invention particle loaded as web; a disk in a cartridge
D Toxi-Tube Basic - (comparative) liquid/liquid extraction
E Toxi-Tube Acidic - (comparative) liquid/liquid extraction The data of Table 8 show that the present invention particle-loaded membranes were at least as good and in most instances better as a screening device than conventional devices for establishing the presence of 20 commonly tested drugs.

Advantages of sulfonated poly(styrene divinylbenzene) particles in a membrane format for comprehensive drug screening include eliminating the need for separate basic and acidic liquid/liquid extractions, and thus two injections for chromatographic analysis. The present invention membrane allows for one extraction (two elution solvents are used and combined before dry down) and one injection for chromatographic analysis, which saves time.

The present invention membrane allows more drugs to be detected in the screening method when compared to conventional liquid/liquid analyses [e.g., amphetamine, methamphetamine, morphine, codeine, cocaine (serum) and amphetamine, methamphetamine, ibuprofen, phencyclidine, phenobarbitol (urine)].

The present invention membrane saves time and money in this screening mode. Also, there is the potential for automation using the present invention materials. Further, the present invention provides a lower detection limit for drugs.

Various modifications and alterations of this invention will become apparent to those skilled in the art without departing from the scope and spirit of this invention, and it should be understood that this invention is not to be unduly limited to the illustrative embodiments set forth herein.

We claim:

1. A method of isolating at least one analyte from a fluid comprising the step of:

passing a fluid including at least one non-ionic neutral analyte through at least one solid phase extraction medium comprising (a) a fibrous matrix, and (b) sorptive particles enmeshed in said matrix comprising (1) in the range of more than 20 to 100 weight percent, based on total particles, of functionalized poly(styrene divinylbenzene) particles comprising at least one ionic functional group selected from the group consisting of sulfonate group, carboxylate group, quaternary ammonium groups $N^+(R)_3$ wherein each R independently is selected from $C_1$ to $C_4$ alkyl groups and aminated groups $N(R^1)_2$ wherein each $R^1$ is independently selected from the group consisting of hydrogen, $C_1$ to $C_4$ alkyl groups, and $C_1$ to $C_4$ alkanol groups covalently bonded thereto, the functionalized particles having sorptive capability towards said non-ionic neutral analyte, the ionic functional group being present in a concentration range of 0.1 to 2.5 milliequivalents per gram of poly(styrene divinylbenzene), and (2) in the range of 0 to less than 80 weight percent, based on total particles, of porous, organic-coated or uncoated, inorganic particles, the ratio of sorptive particles to fibrous matrix being in the range of 40:1 to 1:4 by weight.

2. The method according to claim 1 wherein said analyte exhibits a maximum value in ion exchange capacity factor (k') toward said functionalized particles in said concentration range of 0.1 to 2.5 milliequivalents per gram of poly(styrene divinylbenzene) compared to ion exchange capacity factor (k') of the same analyte toward functionalized sulfonated, carboxylated, quaternary ammonium, or aminated particles comprising functional groups present in an amount outside said concentration range.

3. The method according to claim 1 wherein said ionic functional groups of said particle are present in the range of 0.15 to 2.0 milliequivalents per gram.

4. The method according to claim 1 wherein said ionic functional groups of said particle are present in the range of 0.2 to 1.1 milliequivalents per gram.

5. The method according to claim 1 wherein said ionic functional groups of said particle are present in the range of 0.3 to 0.9 milliequivalents per gram.

6. The method according to claim 1 wherein said ionic functional groups of said particle are present in the range of 0.3 to 0.6 milliequivalents per gram.

7. The method according to claim 1 wherein said ionic group of said particle is a sulfonate group.

8. The method according to claim 1 wherein said ionic group of said particle is a carboxylate group.

9. The method according to claim 1 wherein said ionic group of said particle is a quaternary ammonium group $N^+(R)_3$ wherein each R independently is selected from $C_1$ to $C_4$ alkyl groups.

10. The method according to claim 1 wherein said ionic group of said particle is an aminated group $N(R^1)_2$ wherein each $R^1$ is independently selected from the group consisting of hydrogen, $C_1$ to $C_4$ alkyl groups, and $C_1$ to $C_4$ alkanol groups.

11. The method according to claim 1 wherein said analyte is selected from the group consisting of phenolics, alcohols, ketones, ethers, and esters.

12. The method according to claim 1 wherein said analyte is selected from the group consisting of explosive residues, pesticides, and drugs.

13. The method according to claim 1 wherein said particle has solid phase extraction capability.

14. The method according to claim 1 wherein said particle has an average size in the range of 0.1 to 150 micrometers.

15. The method according to claim 1 wherein said functionalized poly(styrene divinylbenzene) particulate is incorporated into a porous fibrous matrix.

16. The method according to claim 15 wherein said porous fibrous membrane comprises nonwoven fibers.

17. The method according to claim 16 wherein said nonwoven fibers are selected from the group consisting of polyolefin, polyaramid, polyamide, polyurethane, polyester, polyacrylonitrile, glass, and ceramic fibers.

18. The method according to claim 16 wherein said nonwoven fibers are fibrillated polytetrafluoroethylene.

19. The method according to claim 16 wherein said nonwoven fibers are polyolefin fibers.

20. The method according to claim 16 wherein said nonwoven fibers are selected from the group consisting of polyaramid, polyamide, polyurethane, polyester, and polyacrylonitrile fibers.

21. The method according to claim 16 wherein said nonwoven fibers are selected from the group consisting of glass fibers.

22. The method according to claim 15 wherein said solid phase extraction medium is a sheet material.

23. The method according to claim 22 wherein said solid phase extraction medium is a disk.

24. The method according to claim 23 wherein said disk is included in a stack of disks comprising one or more types of particulates.

25. The method according to claim 1 wherein said analyte is a neutral analyte.

26. The method according to claim 1 wherein said non-ionic neutral analyte is an organic analyte.

27. The method according to claim 16 wherein said monomer fibers are selected from the group consisting of ceramic fibers.

28. A method of isolating at least one analyte from a fluid comprising the step of:

passing a fluid including at least one non-ionic neutral analyte through at least one solid phase extraction medium comprising
(a) a fibrous matrix, and
(b) sorptive particles enmeshed in said matrix comprising
(1) in the range of more than 20 to 100 weight percent, based on total particles, of poly(styrene divinylbenzene) particles functionalized with only ionic functional groups selected from the group consisting of sulfonate group, carboxylate group, quaternary ammonium groups $N^+(R)_3$ wherein each R independently is selected from $C_1$ to $C_4$ alkyl groups, and aminated groups $N(R^1)_2$ wherein each $R^1$ is independently selected from the group consisting of hydrogen, $C_1$ to $C_4$ alkyl groups, and $C_1$ to $C_4$ alkanol groups covalently bonded thereto, the functionalized particles having sorptive capability towards said non-ionic neutral analyte, the ionic functional group being present in a concentration range of 0.1 to 2.5 milliequivalents per gram of poly(styrene divinylbenzene), and
(2) in the range of 0 to less than 80 weight percent, based on total particles, of porous, organic-coated or uncoated, inorganic particles, the ratio of sorptive particles to fibrous matrix being in the range of 40:1 to 1:4 by weight.

29. A method of isolating at least one analyte from a fluid comprising the step of:

contacting at least one solid phase extraction medium comprising particles with a fluid including at least one non-ionic neutral analyte for a time and at a temperature sufficient to bind the analyte to the particles, said solid phase extraction medium comprising
(a) a fibrous matrix, and
(b) sorptive particles enmeshed in said matrix comprising
(1) in the range of more than 20 to 100 weight percent, based on total particles, of functionalized poly(styrene divinylbenzene) particles comprising at least one ionic functional group selected from the group consisting of sulfonate group, carboxylate group, quaternary ammonium groups $N^+(R)_3$ wherein each R independently is selected from $C_1$ to $C_4$ alkyl groups and aminated groups $N(R^1)_2$ wherein each $R^1$ is independently selected from the group consisting of hydrogen, $C_1$ to $C_4$ alkyl groups, and $C_1$ to $C_4$ alkanol groups covalently bonded thereto, the functionalized particles having sorptive capability towards said non-ionic neutral analyte, the ionic functional group being present in a concentration range of 0.1 to 2.5 milliequivalents per gram of poly(styrene divinylbenzene), and (2) in the range of 0 to less than 80 weight percent, based on total particles, of porous, organic-coated or uncoated, inorganic particles, the ratio of sorptive particles to fibrous matrix being in the range of 40:1 to 1:4 by weight.

30. The method according to claim 21 further comprising the step of removing the analyte from the particles so as to regenerate the functionalized particles.

* * * * *

UNITED STATES PATENT AND TRADEMARK OFFICE
CERTIFICATE OF CORRECTION

PATENT NO.: 5,618,438
DATED: April 8, 1997
INVENTOR(S): James S. Fritz, Donald F. Hagen, Craig G. Markell, AND Luther W. Schmidt It is certified that error appears in the above-identified patent and that said Letters Patent is hereby corrected as shown below:

Col. 3, Line 11     "functionalization"    should read   -- functionalized polymer --

Col. 17, under the DMP column, "100.1"    should read   -- 100.0 --

Col. 19, under the title TABLE 8, insert the title   -- Detection of Drugs from Extracted Samples --

Col. 20, Line 67     delete "inorganic"

Col. 22, Line 42     delete "inorganic"

Col. 23, Line 7     delete "inorganic"

Signed and Sealed this

Twenty-fifth Day of August, 1998

Attest:

BRUCE LEHMAN

Attesting Officer     Commissioner of Patents and Trademarks